UNITED STATES PATENT OFFICE.

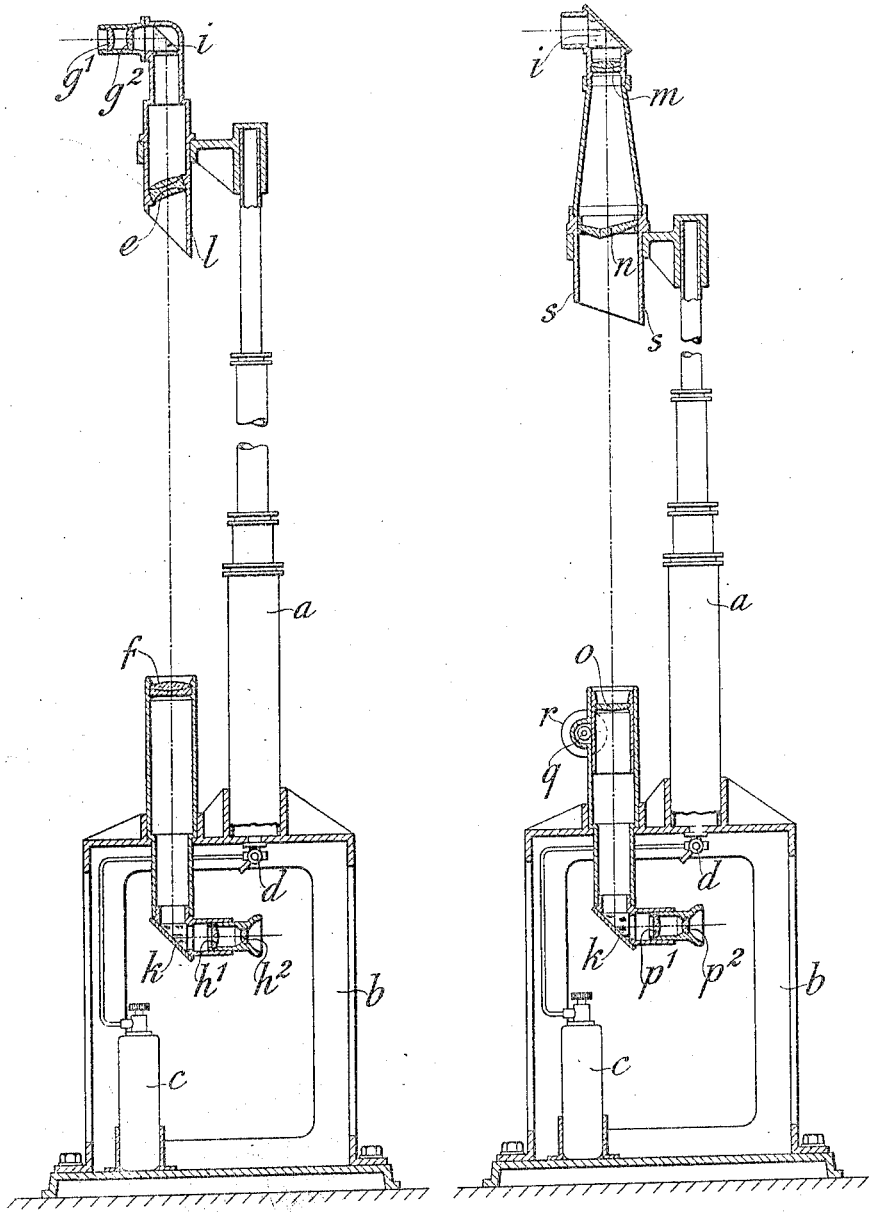

ALBERT KÖNIG, OF JENA, GERMANY, ASSIGNOR TO THE FIRM OF CARL ZEISS, OF JENA, GERMANY.

LOOKOUT-TELESCOPE.

1,097,646.

Specification of Letters Patent.   Patented May 26, 1914.

Application filed February 16, 1914.   Serial No. 819,063.

*To all whom it may concern:*

Be it known that I, ALBERT KÖNIG, a citizen of the German Empire, residing at Jena, Germany, have invented a new and useful Lookout-Telescope, of which the following is a specification.

The present invention relates to so called look-out telescopes, *i. e.* to telescopes of fairly large dimensions having a substantially vertical axis and an approximately horizontal direction of inspection and look-out, which enable the user to observe an open countryside, while himself in cover, and more particularly to look-out telescopes, in which the upper part of the telescope is carried by a support, which is rigid or is adjustable in height and does not form a connection between the upper and the lower parts of the telescope, adapted to exclude lateral light. In the telescopes of this type, such as are known up to the present, the image of the object, presented to the observer, was frequently disturbed by reflections at the glass surfaces of the bottom lens of the upper part of the telescope, which are bounded by air. When such a disturbance was to be avoided by means of a light-tight inclosure (*e. g.* bellows), this was open to objection, in the case of considerable look-out heights, as such an inclosure presents a large surface to the wind.

Now the invention consists in eliminating the said harmful reflections, instead of by a light-tight connection between the upper and lower parts, by placing the bottom lens of the upper part obliquely to the optical axis. By this means the reflected images of the entrance-pupil of the lower part, formed by the said obliquely placed lens, come to lie laterally of the optical axis, and all rays of light, which might enter the lower part of the telescope after being reflected at the obliquely placed lens, can be caught by suitable screens as they must, before being reflected, pass through the plane of the said reflection images, in other words form definitely limited ray pencil systems. The size and position of these screens depends on the nature of the said reflection images or their position. In order that the screens may not also project into the path of the effective rays passing between the upper and the lower part or at least may do so only in a small degree, the curvature of every air-bounded glass surface of the obliquely placed lens is to be so proportioned that the reflection image formed by it has, in so far as it is not a real image, a considerable distance from the reflecting surface. In the latter case the disturbing ray pencil system is comparatively slightly convergent in front of the obliquely placed lens, and passes, therefore, when the lens is placed sufficiently obliquely, even at a quite short distance from the lens outside the path of the effective rays between the upper and the lower part and can, therefore, be cut off by an extension of the wall of the tube surrounding the obliquely placed lens. When the said reflection images are real images, the disturbing light-rays passing through them may be removed, in so far as they are not also caught by the extended wall of the tube, near the locus of the image by small screens, which are placed laterally of the optical axis.

When the disturbing ray pencil system is convergent in front of the obliquely placed lens, when, therefore, the reflection image belonging to it is virtual, the requisite extension of the wall of the tube is the smaller, the greater the inclination of the reflecting lens surface to the optical axis. Hence, in order not to have to produce the wall of the tube too far, it may be of advantage, to form the obliquely placed lens from two segment-shaped lens portions disposed next to one another, which are selected in such a manner that they act as one undivided lens, *i. e.*, that the images formed by them coincide, the two parts being placed obliquely in two directions with respect to the optical axis, so that a bent form of lens results, turning its hollow side upward.

The optical arrangement of a look-out telescope of the type under discussion consists, when, as is the more frequent case in practice, the look-out height is variable, usually of two astronomical telescopes facing each other with their objectives, one of which forms the upper part adjustable in the height direction and the other one the lower fixed part of the look-out telescope; the bottom lens of the upper part acts, therefore, in this case as the objective in the formation of the image. If this objective be placed obliquely to the optical axis, astigmatism will appear in the axis of the telescope. This drawback may, however, be got rid of by well-known means, *e. g.* by the addition of compensating cylindrical lenses or by placing other lenses obliquely, the most satisfactory way, however, being the replacement of the usual telescope objective by an astigmatically corrected objective. In the latter case, however, in consideration of the fact, that the lens is composed of several parts, the employment of a bent form of lens will be generally speaking avoided, from constructional reasons.

When lenses of fairly large diameter are in question, another general arrangement of the lenses of the look-out telescope will be often adopted for the purpose of reducing the weight of the upper part. With such an arrangement the upper part of the telescope contains in the way of lenses only the objective, which forms in its focal plane an image of the sighted, distant objects, and a collective lens in the vicinity of the focal plane of the said objective. The lower part of the telescope contains, besides an astronomical ocular, for the purpose of image-erection a lens-system of reversion, which, in the case of a variable look-out height, is displacable in the direction of the optical axis for optically adapting the telescope to such height. As with the said arrangement the bottom lens of the upper part of the telescope is a collective lens, it can be placed fairly obliquely to the optical axis, without the astigmatism so produced becoming practically detrimental. The amount of the astigmatism increases with the amount of obliquity of the lens and the distance of its effective parts from the focal plane of the objective. Hence, it is of advantage in this case, when considerable obliquity of the lens is required, to give it the above described form of a bent lens, whereby not only, as was also explained above, the tube extension necessary for cutting off the harmful reflections becomes smaller, but the maximum distance of the effective lens parts from the objective focal plane and thereby the astigmatic aberrations become less.

In the annexed drawing Figures 1 and 2 illustrate the invention by two examples of look-out telescopes, which are adjustable in the height direction, each example being shown in a diagrammatic longitudinal section.

The constructional arrangement chosen is the same in both examples, as it is of secondary importance for the present invention. The adjustable support of the upper part of the telescope is formed by a telescopic tubular system $a$, which is mounted laterally of the optical axis on a frame $b$ forming the substructure. The lower part of the telescope is fixed on the frame $b$. The actuation of the telescopic arrangement is effected by means of a compressed gas, which is obtained from a steel bottle $c$ and is conducted to the interior of the tubular system by a three-way cock $d$.

The optical arrangement of the look-out telescope shown in Fig. 1 consists of two astronomical telescopes facing each other. The two objectives are marked $e$ and $f$ and the two ocular systems $g^1$, $g^2$ and $h^1$, $h^2$ respectively; $i$ and $k$ are two reflecting prisms, which bring about the horizontal position of the directions of inspection and look-out. The objective $e$ is disposed obliquely to the optical axis and consists of an astigmatically corrected lens system, the two air-bounded glass surfaces of which each form (because they are convex upward) a real image of the entrance pupil of the lower part of the telescope, which pupil is in the present case formed by the upper edge of this part. The ray pencil systems of these two reflection images are intersected by the extension $l$ of the upper tube, so that by this means all those rays of light coming from without are cut off, which might after reflection at the two reflecting lens surfaces enter the lower part of the telescope and thereby disturb the image presented by the telescope.

The optical arrangement of the second example (Fig. 2) is substantially that of a terrestrial telescope. In the movable upper part of the telescope there is mounted behind a reflecting prism $i$ an objective marked $m$ and in the vicinity of the image plane thereof a collective lens $n$. The latter has a bent form with the hollow side turned upward and is formed of two plano-convex lens parts. The lower part of the telescope contains the reversing system, which serves for erecting the image and is represented by a lens $o$, as well as the reflecting prism $k$ and the ocular system $p^1$, $p^2$. The reversing system $o$ is displaceable in the direction of the optical axis by means of a rack and pinion $q$ and a milled edge wheel $r$, for adapting the telescope to the desired look-out height. The air-bounded surfaces of the collective lens $n$ each form a virtual image of the entrance pupil of the lower part of the telescope, lying at a comparatively great distance from the lens, which entrance pupil is, in this case as well, formed by the upper edge of the said part, and the slightly converging ray pencil systems of these images are again intersected by the extension $s$ of the upper tube, so that all rays of light coming from without are prevented from entering the lower part of the telescope.

I claim:

1. In a look-out telescope two separate optical systems each having its axis broken, disposed one above the other, the axis of emergence of the upper system and the axis of entrance of the lower system being substantially vertical and the bottom lens of the upper system being placed obliquely to the said axis of entrance of the lower system, a frame, to which the lower system is fixed, and a non-light-excluding support attached to the said frame and adapted to carry the upper system.

2. In a look-out telescope two separate optical systems each having its axis broken, disposed one above the other, the axis of emergence of the upper system and the axis of entrance of the lower system being substantially vertical and the bottom lens of the upper system being placed obliquely to the said axis of entrance of the lower system, a frame, to which the lower system is fixed, a non-light-excluding support attached to the said frame and adapted to carry the upper system, and screening means adapted to prevent reflection images of the entrance pupil of the lower system coming from the air-bounded surfaces of the oblique lens from entering the lower system.

3. In a look-out telescope two separate optical systems each having its axis broken, disposed one above the other, the axis of emergence of the upper system and the axis of entrance of the lower system being substantially vertical and the bottom lens of the upper system being formed of two segment-shaped lens portions disposed next to each other, which are adapted to form two images coinciding with one another and are placed obliquely in two directions with respect to the axis of entrance of the lower system, thus forming a roof-shaped lens, which turns its hollow side upward, a frame, to which the lower system is fixed, a non-light-excluding support attached to the said frame and adapted to carry the upper system, and screening means adapted to prevent reflection images of the entrance pupil of the lower system coming from the air-bounded surfaces of the oblique lens from entering the lower system.

4. In a look-out telescope two separate optical systems each having its axis broken, disposed one above the other, the axis of emergence of the upper system and the axis of entrance of the lower system being substantially vertical and the bottom lens of the upper system being placed obliquely to the said axis of entrance of the lower system, at least one of the air-bounded surfaces of which lens is adapted to form a virtual image of the entrance pupil of the lower system at a considerable distance from itself, a frame, to which the lower system is fixed, a non-light-excluding support attached to the said frame and adapted to carry the upper system, and screening means adapted to prevent reflection images of the entrance pupil of the lower system coming from the air-bounded surfaces of the oblique lens from entering the lower system.

ALBERT KÖNIG.

Witnesses:
 PAUL KRÜGER,
 RICHARD HAHN.